(12) United States Patent
Miller

(10) Patent No.: US 11,370,263 B2
(45) Date of Patent: Jun. 28, 2022

(54) SPACE FRAME FRONT UPPER BODY SUPPORT AND FRAME CONNECTION

(71) Applicant: Caterpillar Inc., Peoria, IL (US)

(72) Inventor: Tad W. Miller, Bonney Lake, WA (US)

(73) Assignee: Caterpillar Inc., Peoria, IL (US)

( * ) Notice: Subject to any disclaimer, the term of this patent is extended or adjusted under 35 U.S.C. 154(b) by 432 days.

(21) Appl. No.: 16/663,849

(22) Filed: Oct. 25, 2019

(65) Prior Publication Data
US 2021/0122209 A1 Apr. 29, 2021

(51) Int. Cl.
*B60G 99/00* (2010.01)
*B62D 21/08* (2006.01)
*B62D 21/18* (2006.01)
*B62D 21/15* (2006.01)

(52) U.S. Cl.
CPC ........... *B60G 99/002* (2013.01); *B62D 21/08* (2013.01); *B62D 21/152* (2013.01); *B62D 21/186* (2013.01); *B60G 2204/15* (2013.01); *B60G 2300/09* (2013.01)

(58) Field of Classification Search
CPC .. B62D 21/186; B62D 21/152; B62D 211/08; B60G 99/002
USPC ........................................................ 296/35.3
See application file for complete search history.

(56) References Cited

U.S. PATENT DOCUMENTS

| | | | |
|---|---|---|---|
| 5,385,391 A | 1/1995 | Dickerson | |
| 7,556,310 B2* | 7/2009 | Miki | B62D 25/2018 296/203.02 |
| 7,845,716 B2* | 12/2010 | Kiyotake | B62D 25/082 296/203.02 |
| 8,459,728 B2* | 6/2013 | Fujii | B62D 25/082 296/203.02 |
| 8,485,543 B2* | 7/2013 | Richardson | B62D 7/08 280/124.167 |
| 8,833,832 B2* | 9/2014 | Whipps | B62D 27/023 296/203.02 |
| 9,701,341 B2 | 7/2017 | Ormiston | |
| 9,731,773 B2 | 8/2017 | Gami | |
| 9,751,445 B1 | 9/2017 | Arul | |
| 9,783,041 B2 | 10/2017 | Uranaka | |
| 10,155,543 B2 | 12/2018 | Uranaka | |

(Continued)

FOREIGN PATENT DOCUMENTS

| | | |
|---|---|---|
| EP | 3241691 | 11/2017 |
| JP | 2019116156 | 7/2019 |

*Primary Examiner* — D Glenn Dayoan
*Assistant Examiner* — Sunsurraye Westbrook
(74) *Attorney, Agent, or Firm* — Oblon, McClelland, Maier & Neustadt

(57) ABSTRACT

A front upper frame connection for a space frame can comprise a top surface; a bottom surface opposite the top surface; a right-side surface; a left-side surface opposite the right-side surface; a front surface; a rear surface opposite the front surface; a pair of forward support plates provided on the front surface; a pair of forward flat mounting surfaces; and a pair of rocker attachment interfaces located on the top surface adjacent to the rear surface and respectively the right-side surface and the left-side surface. The front surface and the forward support plates can define a cutout section. Each of the forward support plates is curved and runs outward from a transverse centerline of the top surface and then forward.

20 Claims, 7 Drawing Sheets

(56) References Cited

U.S. PATENT DOCUMENTS

| | | |
|---|---|---|
| 2012/0187719 A1 | 7/2012 | Fujii et al. |
| 2013/0043703 A1 | 2/2013 | Whipps |
| 2019/0135348 A1 | 5/2019 | Schwalbe et al. |

* cited by examiner

SPACE FRAME FRONT UPPER BODY SUPPORT AND FRAME CONNECTION

TECHNICAL FIELD

The present disclosure relates to space frames, and more particularly to space frame front upper body support and frame connections, and systems, components, and methods thereof.

BACKGROUND

Conventional haul trucks, such as off-highway rear haul trucks, may use welded steel frames that can be extremely heavy and may require many meters of welding to fabricate a completed frame. Space frames offer a lighter and stronger alternative to traditional welded steel frames, since far less steel is required. As a result, space frames offer considerable benefits in terms of cost, manufacturability, and performance. For example, haul trucks with space frames comparatively can haul larger payloads and consume less fuel.

Conventional space frame structures may use fabricated nodal connections. Such nodal connections may be used to create space frame structures associated with static applications. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain. Carefully designed high-strength castings and fabrications can be required to provide appropriate stiffness and flexibility characteristics while insuring proper load transfer from the dump body to the wheels.

U.S. Pat. No. 10,183,706 ("the '706 patent") describes a node for interconnecting frame members of a frame. According to the '706 patent, a plurality of cup-shaped node connectors are disposed on the node body, where each of the node connectors includes a closed end attached to the node body and an open end opposite the closed end and extending away from the node body. The '706 patent also describes that a sidewall extends between and connects the closed end to the open end and a tenon is formed on the open end. According to the '706 patent, the tenon is shaped and sized to fit within a frame member, and a transition is formed between the sidewall and the tenon defining a peripheral, radially outward facing groove in cooperation with the frame member, where the groove is shaped and sized to receive a weld.

SUMMARY OF THE DISCLOSURE

In one aspect, a front upper frame connection for a space frame is disclosed. The front upper frame connection can comprise a top surface; a bottom surface opposite the top surface; a right-side surface; a left-side surface opposite the right-side surface and parallel to the right-side surface; a front surface; a rear surface opposite the front surface; a pair of forward support plates provided on the front surface; a pair of forward flat mounting surfaces; and a pair of rocker attachment interfaces located on the top surface adjacent to the rear surface and respectively the right-side surface and the left-side surface. The front surface and the forward support plates can define a cutout section. Each of the forward support plates is curved such that a first portion is parallel to the rear surface and a second portion is perpendicular to the rear surface, the first portion being closer to a transverse centerline of the top surface than the second portion.

In another aspect, a front upper body support and frame connection fabrication for a space frame of a rear haul truck is disclosed. The front upper body support and frame connection fabrication can be comprised of a top surface; a bottom surface opposite the top surface; a right-side surface; a left-side surface opposite the right-side surface; a pair of forward support plates configured to support a pair of front upper suspension connection fabrications; a pair of forward flat mounting surfaces configured to respectively fixedly attach to the front upper suspension connection fabrications; a cutout section positioned between and integral to the pair of forward support plates; a rear left-side mounting surface located at a rear of the left-side surface and configured to weldably attach a cab support frame tube; a rear right-side mounting surface located at a rear of the right-side surface and configured to weldably attach a horizontal frame support fabrication; a pair of outer bottom mounting surfaces located at a rear of the bottom surface and orientated toward the left-side surface and right-side surface, respectively, and configured to weldably attach a pair of front upper frame connection castings; a pair of inner bottom mounting surfaces located at the rear of the bottom surface and orientated away from the left-side surface and right-side surface, respectively, and configured to weldably attach a pair of angled front frame tubes; a pair of rocker attachment interfaces located at a rear of the top surface and positioned toward the left-side surface and right-side surface, respectively, and configured to pivotably attach a pair of support rockers; and a truck cab mounting point located on the top surface and configured to receive a cab isolation mount.

And in yet another aspect, a space frame of a rear haul truck is disclosed. The space frame can comprise a front upper body support and frame connection fabrication having a top surface, a bottom surface opposite the top surface, a right-side surface, and a left-side surface opposite the right-side surface; a pair of support rockers attached to the top surface of the front upper body support and frame connection fabrication via respective rocker attachment interfaces on the top surface of the front upper body support and frame connection fabrication; a pair of front upper frame connections attached to the bottom surface of the front upper body support and frame connection fabrication via respective outer bottom mounting surfaces on the bottom surface of the front upper body support and frame connection fabrication; and a pair of angled front frame tubes attached to the bottom surface of the front upper body support and frame connection fabrication via respective inner bottom mounting surfaces on the bottom surface of the front upper body support and frame connection fabrication. The front upper body support and frame connection fabrication can further include a pair of forward support plates, a pair of forward flat mounting surfaces, and a cutout section between the forward support plates.

Other features and aspects of this disclosure will be apparent from the following description and the accompanying drawings.

DETAILED DESCRIPTION

Figure 1:
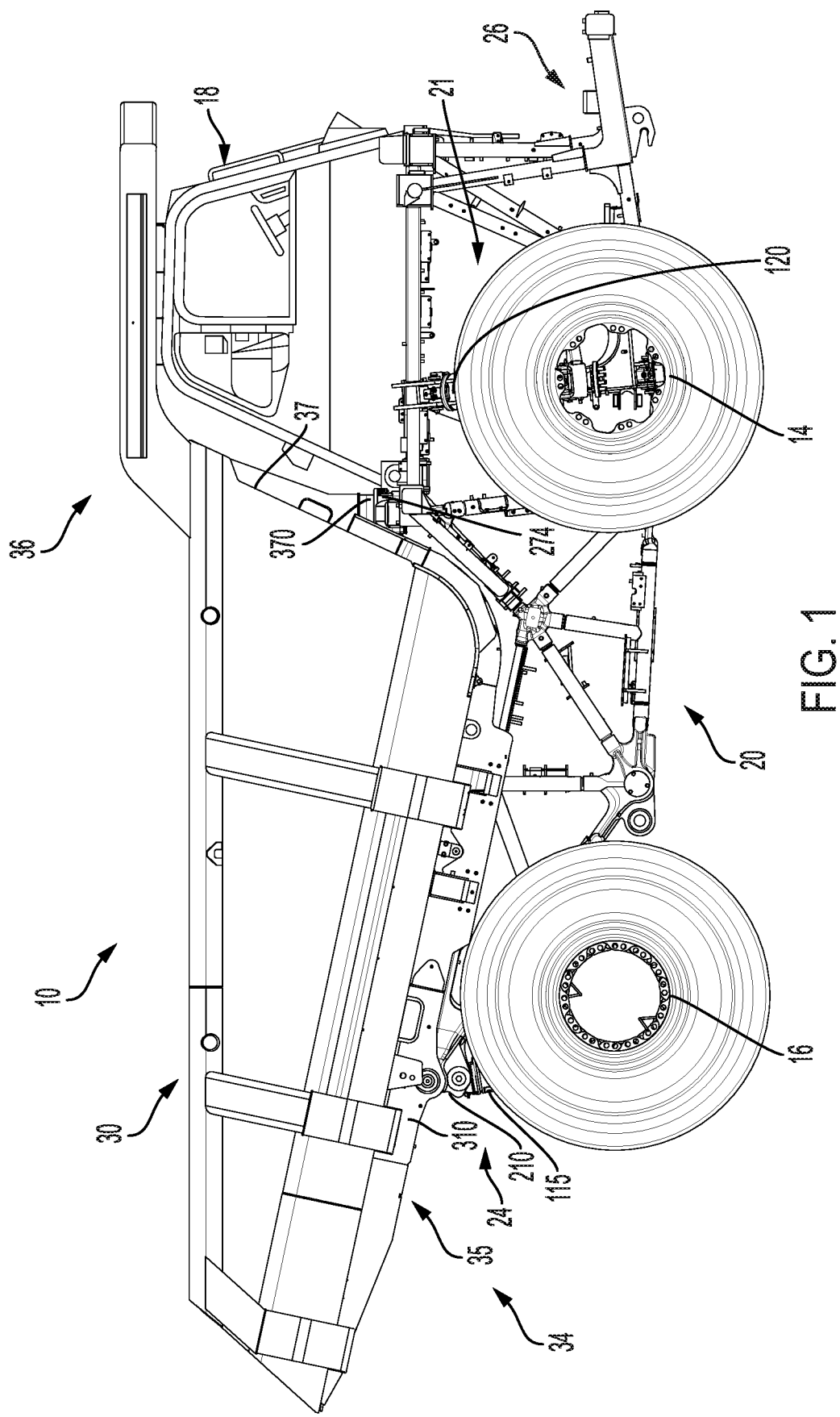
FIG. 1 is a side view of a machine according to embodiments of the disclosed subject matter.
Figure 2:
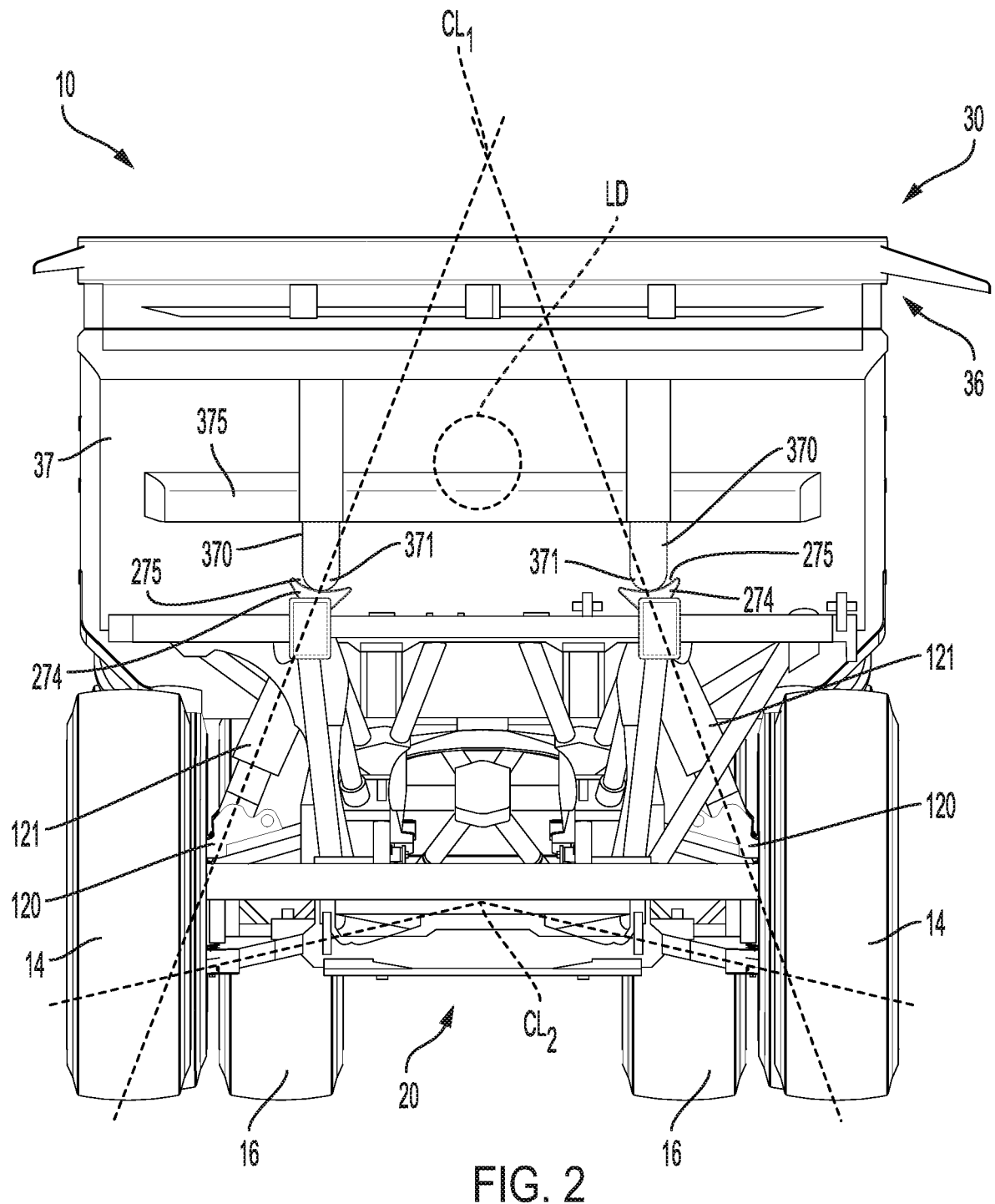
FIG. 2 is a front view of the machine of FIG. 1 with an operator cabin thereof removed to show a space frame and a dump body thereof according to embodiments of the disclosed subject matter.

Referring now to the drawings and with specific reference to FIG. 1 and FIG. 2, these figures illustrate an exemplary embodiment of a machine 10. Machine 10 may be a mobile machine that performs some type of operation associated with an industry such as mining, construction, or any other industry known in the art. For example, as shown in FIG. 1 and FIG. 2, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20 at a front of the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20 at a front 26 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 3:
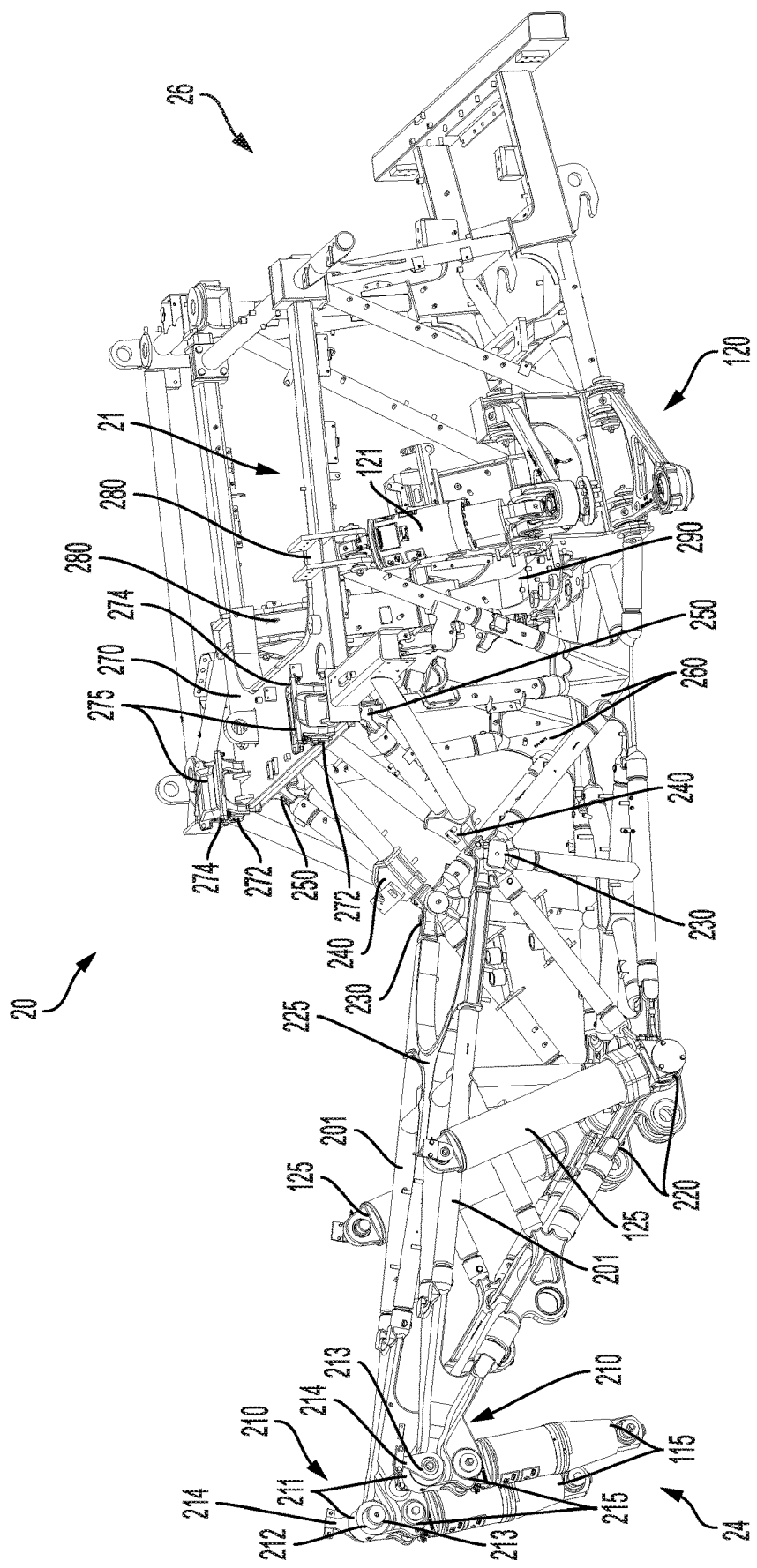
FIG. 3 is a side view of a space frame according to embodiments of the disclosed subject matter.
Figure 4:
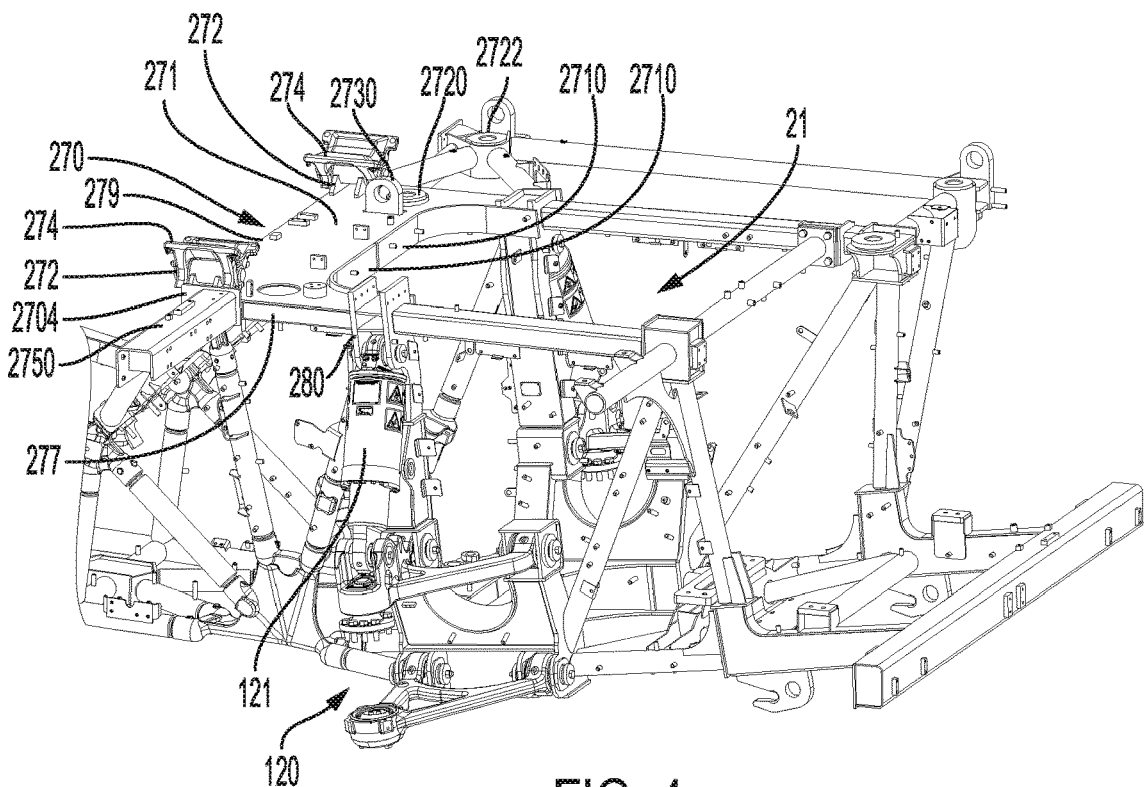
FIG. 4 is a side perspective view of a front upper frame connection according to embodiments of the disclosed subject matter.
Figure 5:
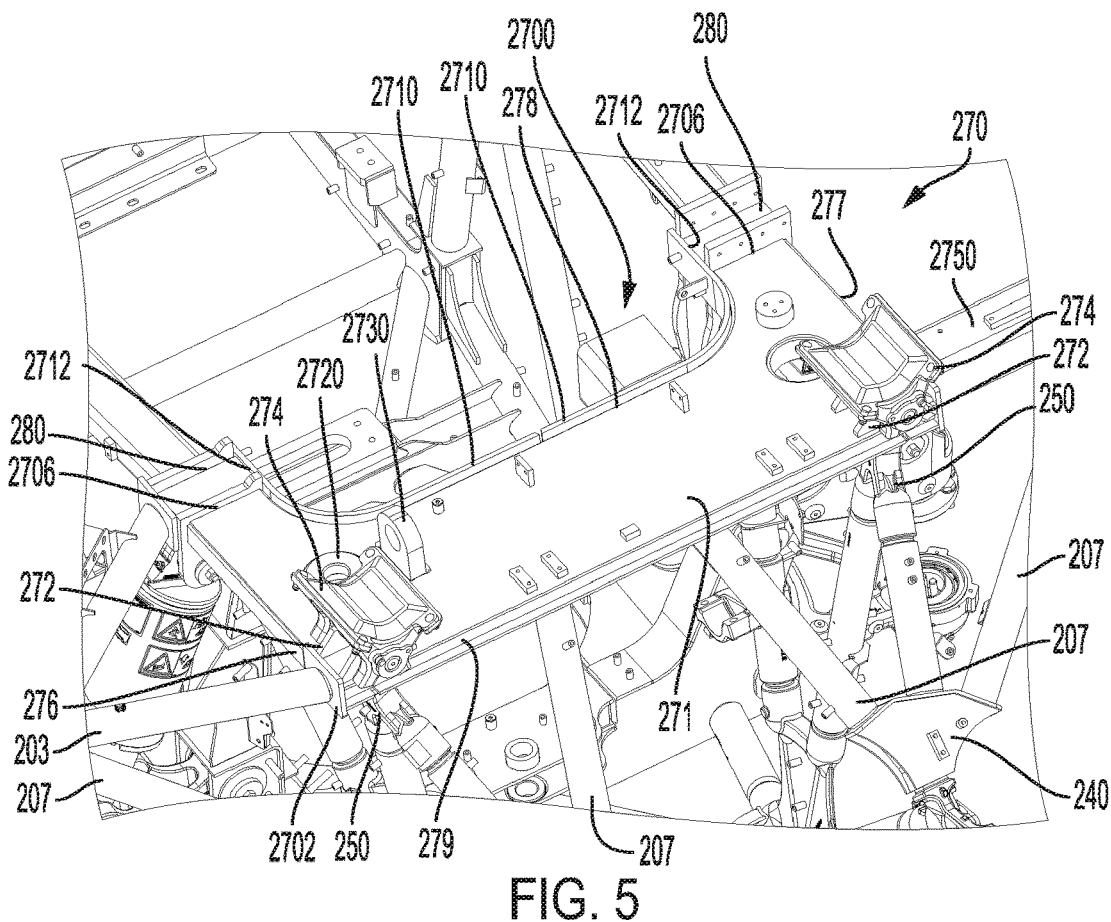
FIG. 5 is an overhead rear view of the front upper frame connection of FIG. 4.
Figure 6:
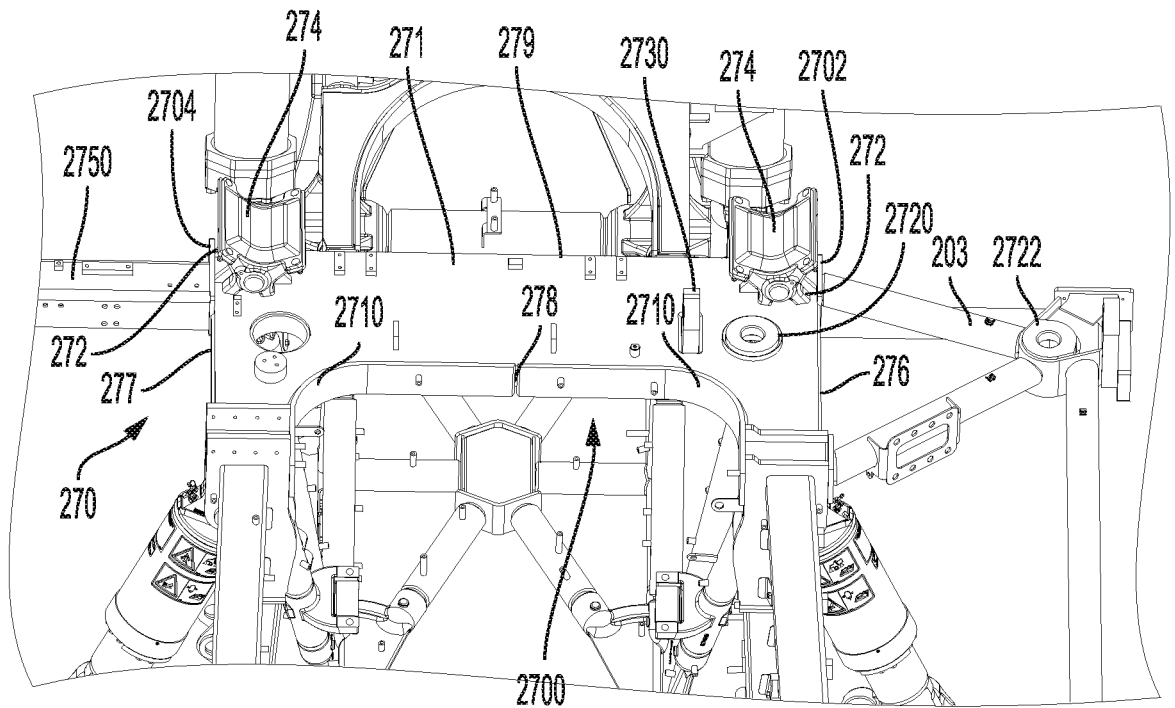
FIG. 6 is an overhead front view of the front upper frame connection of FIG. 4.
Figure 7:
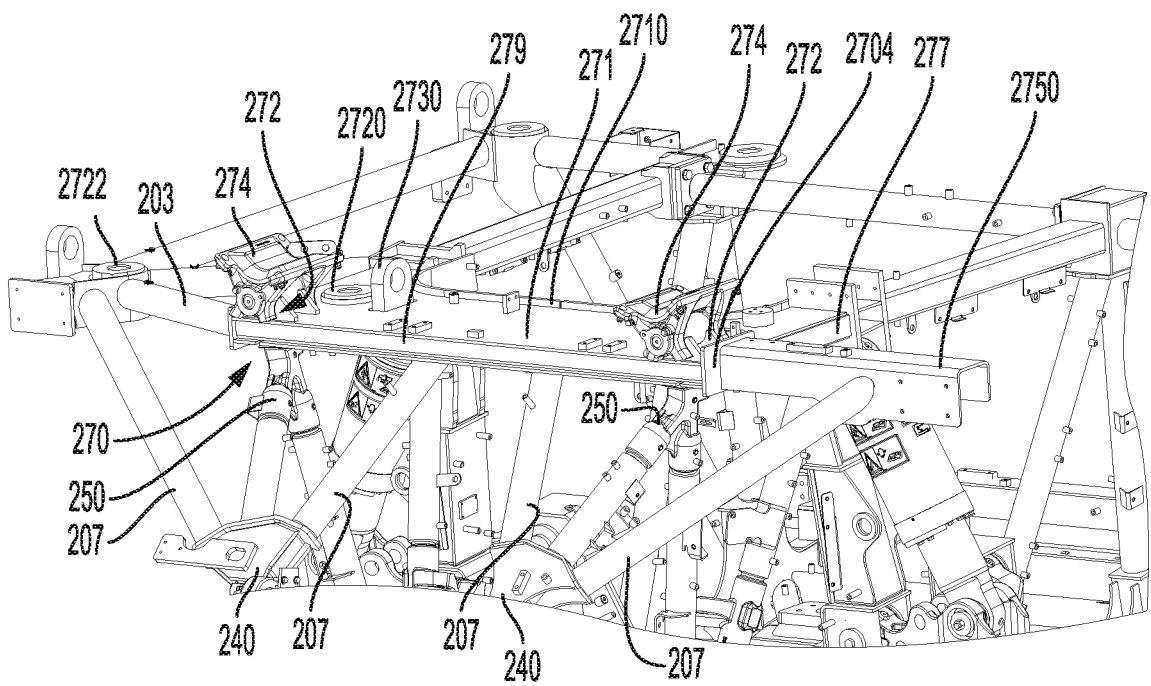
FIG. 7 is a rear view of the front upper frame connection of FIG. 4.
Figure 8:
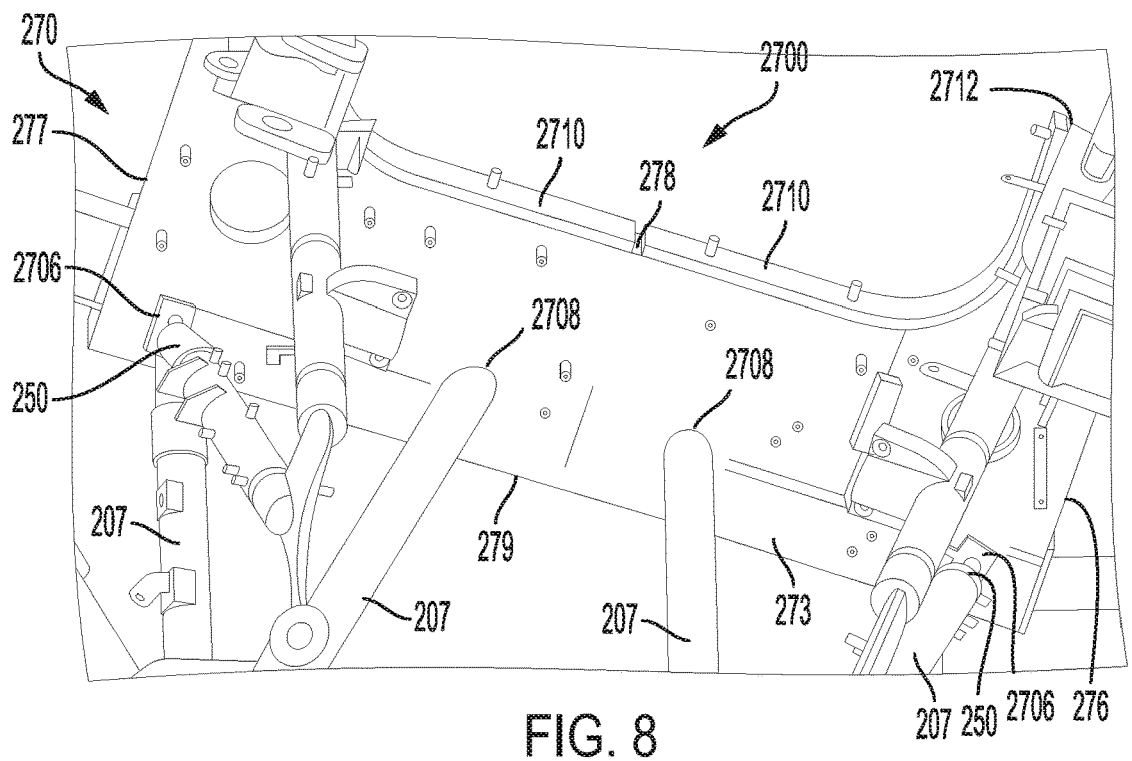
FIG. 8 is a bottom view of the front upper frame connection of FIG. 4.

FIG. 3 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front upper frame connection 270, a pair of front upper suspension connections 280, and a front lower suspension connection 290. Though the foregoing connections are described as pairs, the connections of a pair may not be identical. For instance, the connections of a pair may be symmetrical, generally, but not necessarily identical. The foregoing connections can be castings or fabrications. In general, a casting may refer to a connection that is not welded to another support component of the space frame 20, and a fabrication may refer to a connection that is welded to another support component of the space frame 20.

The center lower frame connections 220 and corresponding connections can be as set forth in U.S. application Ser. No. 16/663,892 filed Oct. 25, 2019 (Case 19-0767); the center upper frame connection 225 and corresponding connections can be as set forth in U.S. application Ser. No. 16/663,930 filed Oct. 25, 2019 (Case 19-0768); the center upper frame connections 230 and corresponding connections can be as set forth in U.S. application Ser. No. 16/664,042 filed Oct. 25, 2019 (Case 19-0773); the center upper frame nodal connections 240 and corresponding connections can be as set forth in U.S. application Ser. No. 16/663,955 filed Oct. 25, 2019 (Case 19-0771); the front upper frame connections 250 and corresponding connections can be as set forth in U.S. application Ser. No. 16/664,010 filed Oct. 25, 2019 (Case 19-0772); the front lower frame connections 260 and corresponding connections can be as set forth in U.S. application Ser. No. 16/664,104 filed Oct. 25, 2019 (Case 19-0762); the front upper suspension connections 280 and corresponding connections can be as set forth in U.S. application Ser. No. 16/664,124 filed Oct. 25, 2019 (Case 19-0759); and/or the front lower suspension connection 290 and corresponding connections can be as set forth in U.S. application Ser. No. 16/664,169 filed Oct. 25, 2019 (Case 19-0760). The foregoing applications are incorporated herein by reference in their entireties.

The space frame 20 can also include a plurality of elongate support members, such as elongate support members 201, elongate support members 203, and elongate support members 207. Elongate support members, according to embodiments of the disclosed subject matter, can be in the form of rods and/or tubes, circular, for instance, where some or all of the rods and/or tubes may be solid or hollow.

Each elongate support member 201 can be provided between the rear frame connections 210 and the front upper frame connection 270 in a top plan view of the space frame 20. More specifically, each elongate support member 201 can be provided between the center upper horizontal frame connection 225 and one of the rear frame connections 210. Further, each elongate support member 201 can extend lengthwise generally horizontally, in this case rearward from the center upper horizontal frame connection 225 at a positive acute angle relative to a horizontal plane running through the front wheels 14 and the rear wheels 16. In that the elongate support members 201 are provided at an outer portion of the space frame 20 in a width direction of the space frame 20, the elongate support members 201 may be considered outer elongate support members 201. As an example, the outer elongate support members 201 may be outer frame tubes.

Each rear frame connection 210, which may be a casting, can have a rear support 211 and a rear suspension node 215. Discussed in more detail below, the rear support 211 can directly support the dump body 30, and the rear suspension node 215 can be coupled to a rear suspension member 115 of the rear suspension system. The rear frame connections 210 can also be coupled to a plurality of elongate support members, including elongate support members 201. According to one or more embodiments of the disclosed subject matter, each of the rear frame connections 210 can be seven-point connections. For instance, according to embodiments of the disclosed subject matter, the rear frame connections 210 and corresponding connections can be as set forth in U.S. application Ser. No. 16/663,815 filed Oct. 25, 2019 (Case 19-0764), which is incorporated herein by reference in its entirety.

The rear support 211 can be configured as a pivot pin boss with a pivot pin bore or opening 212. According to one or more embodiments, an outer surface of the rear support 211 (i.e., pivot pin boss) and the pivot pin bore 212 can be cylindrical. An axis of the pivot pin bore 212 can extend in a width direction of the space frame 20. Moreover, the axes of the pivot pin bores 212 from the rear supports 211 of the pair of rear frame connections 210 may be aligned with each other. That is, the axes of the pivot pin bores 212 can be coaxial or common. The pivot pin bore 212 can be configured to receive a pivot pin of a pivot pin interface 213 such that the pivot pin interface 213 is pivotally coupled to the rear support 211 via the pivot pin bore 212 and the pivot pin interface 213 can pivot or rotate about the axes of the pivot pin bore 212 and the pivot pin of the pivot pin interface 213. Discussed in more detail below, the pivot pin interface 213 can also be coupled to a bottom 35 of the dump body 30.

Turning to FIGS. 4-9, the front upper frame connection 270, which may be a fabrication, can include a top surface 271, a bottom surface 273 opposite the top surface 271, a right-side surface 277, a left-side surface 276 opposite the right-side surface 277, a front surface 278, and a rear surface 279 opposite the front surface 278. As shown, the top surface 271 may have a length greater than a width. For instance, the length may be at least twice the width. Also shown, the length of the top surface 271 can run in the width direction of the space frame 20.

The front upper frame connection 270 can also include a pair of forward support plates 2710 and a pair of forward flat mounting surfaces 2714. Alternatively, the forward support plates 2710 can be a single forward support plate 2710. The forward support plates 2710 may be fixedly attached to the front surface 278, for instance, via welding. Alternatively, the forward support plates 2710 can be formed in one-piece or integral with the front surface 278.

A cutout section 2700 can be provided at least between the forward flat mounting surfaces 2714 and, as shown in FIGS. 4-9, in one or more embodiments between the forward support plates 2710. The front surface 278 and/or the forward support plates 2710 may define the cutout section 2700. Thus, in one or more embodiments, the cutout section 2700 may be considered integral to the forward support plates 2710.

As shown in FIGS. 4-9, the forward support plates 2710, which may extend above the top surface 271, can run from ends at a transverse centerline of the top surface 271 between the two forward support plates 2710 outward and forward to respective opposite ends. As a non-limiting example, the opposite ends of the forward support plates 2710 can extend forward past the forward flat mounting surfaces 2714. The forward support plates 2710 can conform to the contour of the cutout section 2700. For example, the forward support plates 2710 can be curved such that a first portion is parallel to the rear surface 279 and a second portion is perpendicular to the rear surface 279. The first portions can be closer to the transverse centerline of the top surface 271 than the second portions, where the second portions can include the opposite ends of the forward support plates 2710. Moreover, at least the first portions can be closer to the transverse centerline of the top surface 271 than the forward flat mounting surfaces 2714.

The forward support plates 2710 and the forward flat mounting surfaces 2714 can be adapted to contact or abut different portions of respective front upper suspension connections 280. For example, the forward support plates 2710, particularly outer lateral sides 2712 thereof, can be adapted to contact inward facing portions of the front upper suspension connections 280. Optionally, the forward support plates 2710 may not be fixedly attached (e.g., welded) to the front upper suspension connections 280. The forward flat mounting surfaces 2714, on the other hand, can be adapted to contact or abut rear mounting surfaces of the front upper suspension connections 280. The forward flat mounting surfaces 2714 can be adapted to be fixedly attached (e.g., welded) to the rear mounting surfaces of the front upper suspension connections 280.

The rocker attachment interfaces 272, which can be fabrications, can be provided on the top surface 271, in spaced relation with each other in a width direction of the space frame 20, for instance, provided at opposite rear corners of the top surface 271, such as shown in FIGS. 3-7. Thus, according to one or more embodiments, the rocker attachment interfaces 272 can be forward of the rear surface 279 and aft of the forward flat mounting surfaces 2714 and the forward support plates 2710.

Each rocker attachment interface 272 can have a pivot pin bore configured to receive a pivot pin. Optionally, the pivot pin can be considered part of the rocker attachment interface 272. An axis of rotation for the pivot pin bore and the pivot pin can run horizontally or substantially horizontally in a length direction of the space frame 20. Moreover, the axes of rotation for the rocker attachment interfaces 272 can be parallel to each other.

Each rocker attachment interface 272 can have rotatably or pivotally attached thereto a support rocker 274 via the pivot pin. In that the rocker attachment interfaces 272 can be spaced apart from each other in the width direction of the space frame 20, so too can be the support rockers 274. Moreover, the support rockers 274 can rotate or pivot laterally or in a width direction of the space frame 20 about the respective axes of rotation defined by the rocker attachment interfaces 272.

According to embodiments of the disclosed subject matter, each support rocker 274 can have an upward-facing contact surface 275. The upward-facing contact surface 275 can be concave, for instance, semi-cylindrical, elliptical, or multi-planar. Additionally, the upward-facing contact surface 275 can be or include a padding. According to embodiments of the disclosed subject matter, the support rocker 274 and/or components thereof, can be according to U.S. application Ser. No. 16/663,512 filed Oct. 25, 2019 (Case 18-1266) and/or U.S. application Ser. No. 16/663,551 filed Oct. 25, 2019 (Case 19-0783), each of which is incorporated herein by reference in its entirety. Discussed in more detail below, the support rockers 274, particularly the upward-facing contact surfaces 275 thereof, can receive a portion of corresponding vertical support structures 370 of the dump body 30 (see FIG. 10).

The front upper frame connection 270 can also include a rear left-side mounting surface 2702, a rear right-side mounting surface 2704, a pair of outer bottom mounting surfaces 2706, a pair of inner bottom mounting surfaces 2708, and a truck cab mounting point 2720. The rear left-side mounting surface 2702 can be located at a rear of the left-side surface 276, the rear right-side mounting surface 2704 can be located at a rear of the right-side surface 277, the outer bottom mounting surfaces 2706 can be located at a rear of the bottom surface 273, the inner bottom mounting surfaces 2708 can be located at the rear of the bottom surface 273, and the truck cab mounting point 2720 located on the top surface 271.

Figure 9:
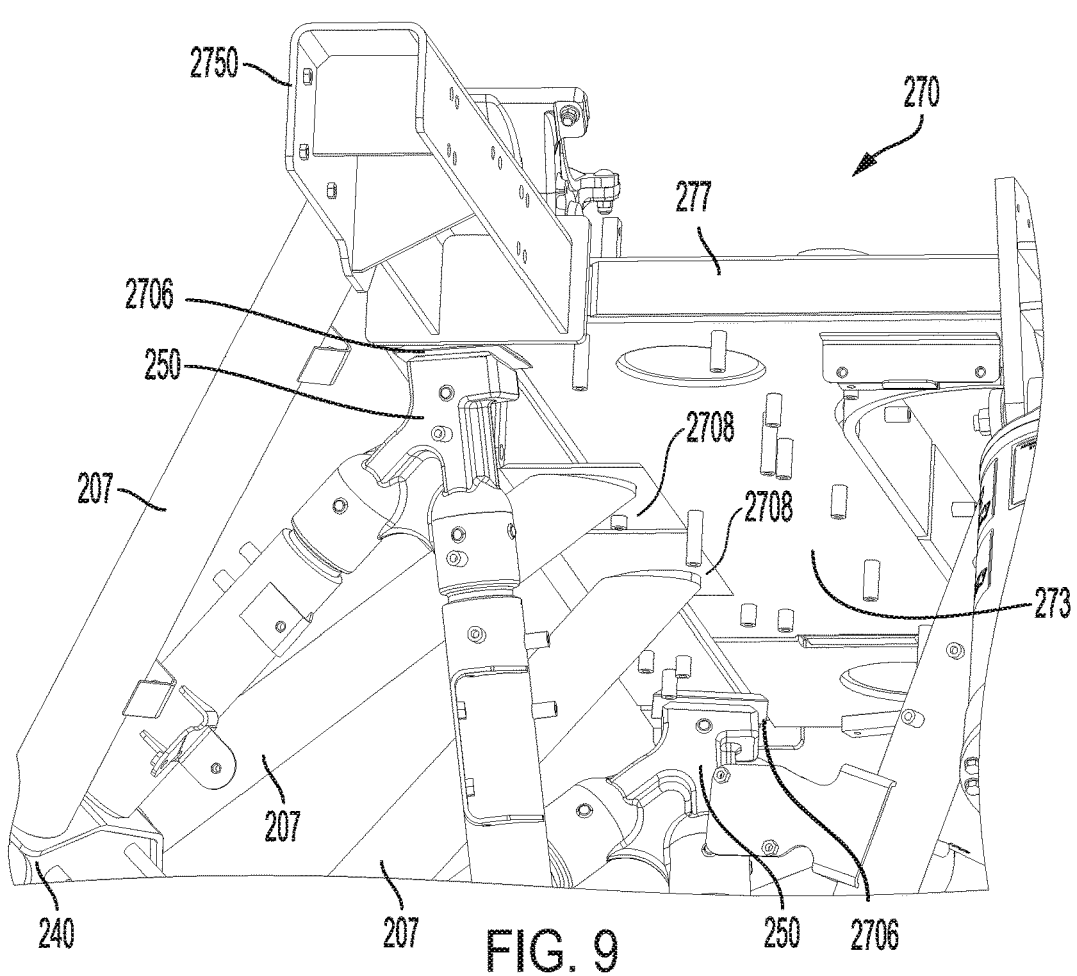
FIG. 9 is a right side view of the front upper frame connection of FIG. 4.

Additionally, the outer bottom mounting surfaces 2706 can be respectively located adjacent the left-side surface 276 and the right-side surface 277, for instance, at opposing rear corners of the bottom surface 273, such as shown in FIG. 9. The inner bottom mounting surfaces 2708 can be positioned well inward of the left-side surface 276 and the right-side surface 277, for instance, adjacent and symmetrical about a transverse centerline of the bottom surface 273, such as shown in FIG. 9. According to one or more embodiments, the truck cab mounting point 2720 can be positioned between the forward flat mounting surface 2714 and the rocker attachment interface 272 on the left side of the top surface 271.

The rear left-side mounting surface 2702 can be adapted to be fixedly attached (e.g., weldably attached) to an elongate support member 203. Elongate support member 203 may be a cab support frame tube. The rear left-side mounting surface 2702 can be thicker than the left-side surface 276, for instance, sized to accommodate the size of the elongate support member 203.

The rear right-side mounting surface 2704 can be adapted to be fixedly attached (e.g., weldably attached) to a horizontal frame support 2750, which may be a fabrication. The rear right-side mounting surface 2704 can be thicker than the right-side surface 277, for instance, sized to accommodate the size of the horizontal frame support 2750.

The outer bottom mounting surfaces 2706 can be adapted to have fixedly attached (e.g., weldably attached) thereto front upper frame connections 250. The outer bottom mounting surfaces 2706 can be sized to accommodate the size of the front upper frame connections 250.

The inner bottom mounting surfaces 2708 can be adapted to have fixedly attached (e.g., weldably attached) thereto elongate support members 207. Elongate support members 207 may extend from the inner bottom mounting surfaces 2708 at an angle (e.g., an acute angle) with respect to each other and, hence, may be referred to herein as angled front frame tubes. Such elongate support members 207 may be fixedly attached to respective center upper frame nodal connections 240. The inner bottom mounting surfaces 2708 can be sized to accommodate the size of the elongate support members 207.

The truck cab mounting point 2720, along with truck cab mounting point 2722, can be configured to receive a cab isolation mount for mounting the operator cabin 18. According to one or more embodiments, the top surface 271 can also include an attachment interface 2730 for a rollover protection system (ROPS).

Figure 10:
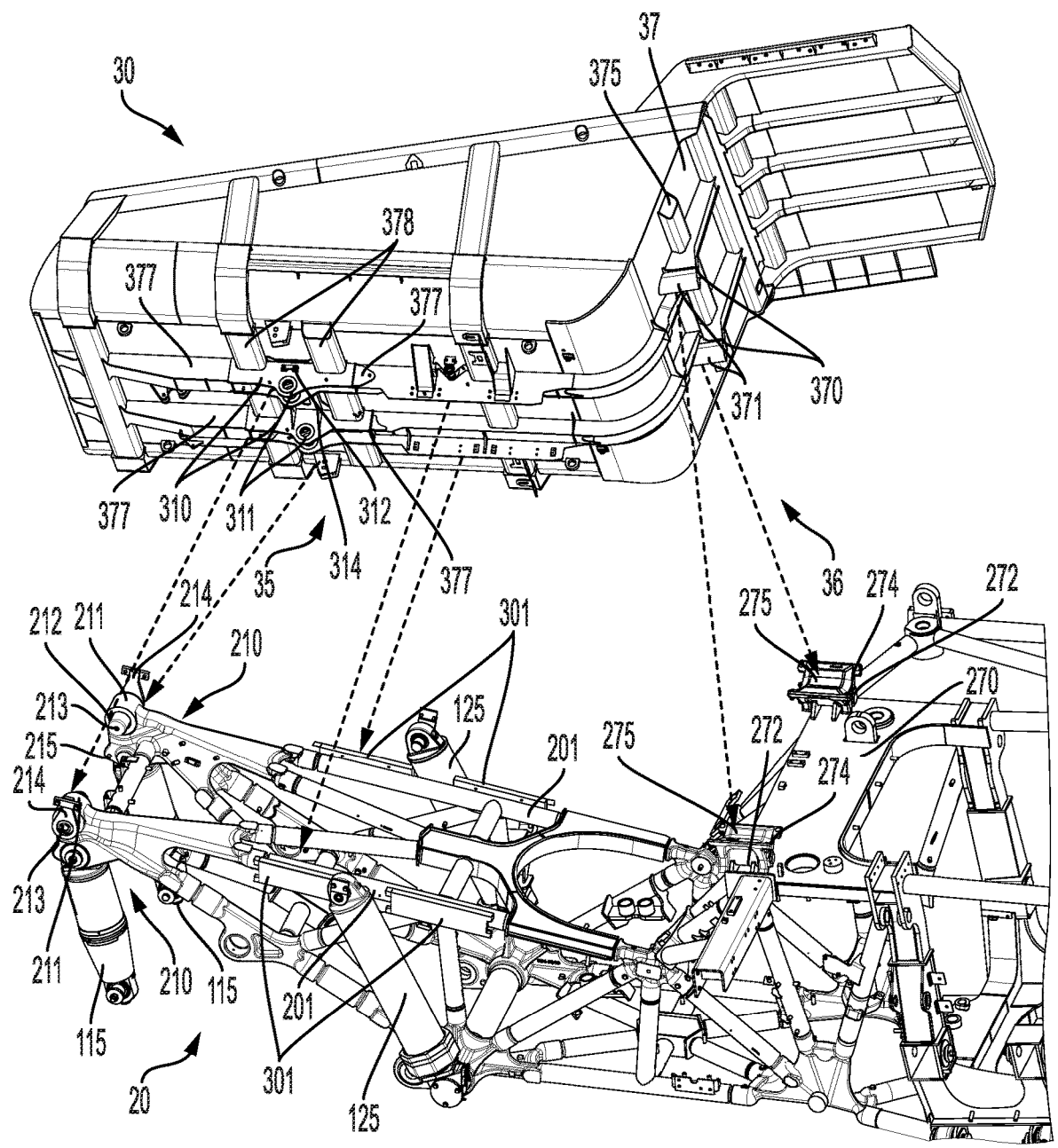
FIG. 10 is an exploded view of the space frame and dump body to show defined contact points according to embodiments of the disclosed subject matter.

Turning now to FIG. 10, the dump body 30 can have, on the bottom 35 thereof, a rear pivot support 310 and a pair of flat contact surfaces 301, and on the front wall 37 thereof, a pair of vertical support structures 370.

The rear pivot support 310 can be provided at the rear portion 34 of the dump body 30, such as shown in FIG. 10. The rear pivot support 310 can have a pair of rear pivots 311. The rear pivots 311 can be spaced apart from each other in a width or lateral direction of the dump body 30, such as shown in FIG. 10. The rear pivot support 310 can also include a cross-member 314, which can be provided between the rear pivots 311, fixedly connected to or part of the rear pivots 311 (i.e., integral and/or one-piece with).

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom of the dump body 30. As shown in FIG. 10, for instance, each rear pivot 311 can be welded in-line with the corresponding longitudinal body support member 377. Thus, the rear pivot 311 can be considered as part of the longitudinal body support member 377 (i.e., integral and/or one-piece with).

Each rear pivot 311 can also include a plurality of cut-outs, for instance, two cut-outs, spaced apart from each other in a length direction of the dump body 30. Each cut-out can receive or accept a transverse body support member 378. Moreover, the cut-outs of one of the rear pivots 311 can receive different transverse body support members 378, for instance, adjacent transverse body support members 378, such as shown in FIG. 10. Additionally, as shown, each transverse body support member 378 can extend through one cut-out of one rear pivot 311 and through an opposing cut-out of the other rear pivot 311.

According to one or more embodiments of the disclosed subject matter, the rear pivots 311 can also include an attachment interface 312 on an outer side surface thereof, such as shown in FIG. 10. As a non-limiting example, the attachment interface 312 can include a pair of projections configured to mate with corresponding notches of the pivot pin interface 213. The rear pivot support 310 and corresponding connections can be as set forth in U.S. application Ser. No. 16/663,627 filed Oct. 25, 2019 (Case 19-0763), which is incorporated herein by reference in its entirety.

The rear pivots 311 can be pivotally coupled to the rear supports 211 of the space frame 20 via the pivot pin interface 213. More specifically, for each rear pivot 311/rear support 211 pair, the rear support 211 can be provided in a pivot bore of the rear pivot 311 (e.g., between the two pivot bore portions of a single rear pivot 311) such that the pivot bore 212 of the rear support 211 is aligned with the pivot bore and such that a pin of the pivot pin interface 213 extends through the pivot bore 212 of the rear support 211 and the pivot bore of the rear pivot 311. An arm 214 of the pivot pin interface 213 can have one or more notches configured to be mated with corresponding one or more projections of the attachment interface 312.

The pivot pin interface 213 can be held in place by way of the interconnection between the notches of the pivot pin interface 213 and the projections of the attachment interface 312. Moreover, the arm 214 can be fixedly coupled to the attachment interface 312. For example, a bracket can be fixedly or removably coupled to the projections, over the arm 214 of the pivot pin interface 213, to prevent the pivot pin interface 213 from moving laterally outward from the rear pivot 311. The bracket can be fixed to the projections via bolts, rivets, or welding as non-limiting examples.

The bottom 35 of the dump body 30 can include the plurality of flat contact surfaces 301, such as shown in FIG. 10. The flat contact surfaces 301 may be in the form of a plate, such as a rectangular or square plate, though embodiments of the disclosed subject matter are not limited to the foregoing geometries. Optionally, the flat contact surfaces 301 can have a chamfered portion on a bottom edge thereof. The flat contact surfaces 301 can be provided generally at a middle portion of the dump body 30. In a top plan view of the dump body 30, the pair of flat contact surfaces 301 can be between the rear pivot support 310 and the pair of vertical support structures 370 in the length direction of the dump body 30. Additionally, the flat contact surfaces 301 can be provided on corresponding longitudinal support body members 377. For instance, the flat contact surfaces 301 can be provided on inward-facing surfaces of the longitudinal support body members 377. Thus, in embodiments of the disclosed subject matter, the flat contact surfaces 301 can be vertically-oriented, such as shown in FIG. 10. Moreover, the flat contact surface 301 on one longitudinal support body member 377 can be spaced apart from the flat contact surface 301 on the opposing longitudinal support body member 377 in the width direction of the dump body 30. The flat contact surfaces 301 can be coupled to the longitudinal support body members 377, for instance, by welding, rivets, or bolts, as non-limiting examples.

According to one or more embodiments, each flat contact surface 301 can be comprised of a first flat contact surface portion and a second flat contact surface portion spaced from the first flat contact surface portion in the length direction of the dump body 30, such as shown in FIG. 10. Optionally, the first and second flat contact surface portions of the flat contact surface 301 may be of the same configuration. Of course, each flat contact surface 301, according to one or more embodiments of the disclosed subject matter, may be represented by a single flat contact surface (e.g., a single plate). For example, only one of the first or second flat contact surface portions shown in FIG. 10 may constitute the flat contact surface 301.

Discussed in more detail below, when the dump body 30 is in a lowered position (i.e., rest position), the flat contact surfaces 301 attached to the dump body 30 can be positioned as shown in FIG. 10. That is, the flat contact surfaces 301 can be provided adjacent to outer or lateral sides of the outer elongate support members 201. According to one or more embodiments, the flat contact surfaces 301 can be parallel to the outer elongate support members 201.

The vertical support structures 370 of the dump body 30 can extend from a front face of front wall 37 of the dump body 30. The vertical support structures 370 can be fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the machine 10, such as shown in FIG. 2. The vertical support structures 370 can be as set forth in U.S. application Ser. No. 16/663,825 filed Oct. 25, 2019 (Case 19-0770), which is incorporated herein by reference in its entirety.

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 10 degrees or less from vertical.

According to one or more embodiments, the vertical support structures 370 can extend through a horizontal support structure 375, which can also be fixed (e.g., welded) to the front face of the front wall 37. Intersecting surfaces of the horizontal support structure 375 and each vertical support structure 370 can be fixedly attached via welding, for instance. The horizontal support structure 375 can be as set forth in U.S. application Ser. No. 16/663,825 filed Oct. 25, 2019 (Case 19-0770), which, as noted above, is incorporated herein by reference in its entirety.

Each vertical support structure 370 can have a down-facing contact surface 371. According to one or more embodiments, the down-facing contact surface 371 can be convex, for instance, semi-cylindrical, elliptical, or multi-planar. The down-facing contact surfaces 371 can be configured to be received or seated in the upward-facing contact surfaces 275 of the support rockers 274. Unlike the support rockers 274, the vertical support structures 370, themselves, do not pivot.

INDUSTRIAL APPLICABILITY

As noted above, embodiments of the present disclosure relate to space frame front upper body support and frame connections, and systems, components, and methods thereof.

Embodiments of the disclosed subject matter can provide a lightweight, durable machine configuration with a reliable support definition of load points between the dump body 30 and the space frame 20, for instance, in light of dimensional variations due to tolerances and/or component deflection.

According to embodiments of the disclosed subject matter, the dump body 30 can operatively contact the space frame 20 according to a predetermined contact arrangement. For example, embodiments of the disclosed subject matter can provide for a six-point contact arrangement between the dump body 30 and the space frame 20. According to embodiments of the disclosed subject matter, such contact arrangement can be provided when the dump body 30 is in a rest position. Rest position as used herein can mean that the dump body 30 is in a lower-most or fully down position and not raised by the lift cylinders 125, which may be coupled to the center lower frame connections 220.

Referring to FIG. 10, which shows an exploded view of the space frame 20 and the dump body 30 of the machine 10, a first pair of contact points can be provided by the rear supports 211 of the space frame 20 and the rear pivots 311 of the rear pivot supports 310 of the dump body 30. Each rear support 211 can be pivotally connected to the dump body 30 via the rear pivot 311. Such connection can allow the front portion 36 of the dump body 30 to be raised and lowered between upper-most and lower-most positions via rotation about the common pivot axis created by the connection between the rear supports 211 and the rear pivots 311.

A second pair of contact points can be provided by the positioning of the flat contact surfaces 301 relative to the elongate support members 201. In particular, the flat contact surfaces 301, which notably can be on or part of the dump body 30 and not the space frame 20, can be provided adjacent to outer or lateral sides of the elongate support members 201, such as shown in FIG. 10. As noted above, the flat contact surfaces 301 may be positioned parallel to the elongate support members 201. Additionally, according to one or more embodiments of the disclosed subject matter, the flat contact surfaces 301 can contact the elongate support members 201. Such positioning of the flat contact surfaces 301 can be when the dump body 30 is in the lower-most or rest position. Moreover, such positioning of the flat contact surfaces 301 can accommodate for lateral or horizontal forces from the corresponding the elongate support members 201 of the space frame 20. Additionally, as noted above, the flat contact surfaces 301 may have a chamfered portion on a bottom edge thereof. Such chamfered portion can aid in the centering of the dump body 30 when the dump body 30 is transitioned to the rest or fully down position.

A third pair of contact points can be provided by the positioning of the vertical support structures 370, particularly the down-facing contact surfaces 371 thereof, removably on the support rockers 274, particularly the upward-facing contact surfaces 275 thereof.

The front upper frame connection 270, which can include a top surface 271, a bottom surface 273 opposite the top surface 271, a right-side surface 277, a left-side surface 276 opposite the right-side surface 277, a front surface 278, and a rear surface 279 opposite the front surface 278, can have on the top surface 271 thereof rocker attachment interfaces 272. Each rocker attachment interface 272 can have a pivot pin bore configured to receive a pivot pin. Moreover, each rocker attachment interface 272 can have rotatably or pivotally attached thereto one of the support rockers 274 via the pivot pin. The support rockers 274 can rotate or pivot laterally or in the width direction of the space frame 20 about the respective axes of rotation defined by the rocker attachment interfaces 272.

According to embodiments of the disclosed subject matter, the down-facing contact surface 371 can be removably seated on the upward-facing contact surface 275. Additionally, in a front view of the machine 10 a vertical centerline axis of the down-facing contact surface 371 of each of the vertical support structures 370 can be offset from the axis of rotation (i.e., pivot axis) of a corresponding one of the support rockers 274. For example, as shown in FIG. 2, the vertical centerline axis of the down-facing contact surface 371 can be offset inward in a width direction of the machine 10 relative to the axis of rotation for the support rocker 274.

The vertical support structures 370, particularly the down-facing contact surfaces 371 when contacting the upward-facing contact surfaces 275 of the support rockers 274, can transfer loading through the space frame 20 to the front suspension system and the front wheels 14. Moreover, the vertical support structures 370 can provide support for horizontal components of force vectors with respect to the dump body 30 load being transferred through the space frame 20 and the front suspension system to the front wheels 14. Additionally, because the support rockers 274 can pivot laterally and independently of each other, and because both the support rockers 274 and the vertical support structures 370 have cooperating contact surfaces (i.e., upward-facing contact surfaces 275 and down-facing contact surfaces 371, respectively), proper seating between the vertical support structures 370 and the support rockers 274 can be maintained, particularly when the dump body 30 is in the at-rest position, even when the machine 10 is moving, for instance. Such arrangement, as diagrammatically shown in FIG. 2, can thus provide an even load distribution LD with respect to each side of the support arrangement (i.e., side to side or laterally).

Additionally shown in FIG. 2, in a front view the support rocker 274/vertical support structure 370 combinations can be located along longitudinal axes of respective front struts 121 connected to respective front suspension members 120 on same sides of the space frame 20. For example, the pivot axis of the support rocker 274 may be aligned with a longitudinal axis a corresponding front strut 121. The longitudinal axes can intersect at a point $CL_1$ at a vertical centerline at a top of the dump body 30. Of course, embodiments of the disclosed subject matter are not so limited, and the longitudinal axis of the front strut 121 may not be aligned with the support rocker 274/vertical support structure 370 combination, such as the pivot axis of the support rocker 274. Also shown in FIG. 2, longitudinal axes of additional suspension members on opposite sides of the space frame 20 can intersect at a point $CL_2$ at the same vertical centerline of the machine 10 as point $CL_1$. The arrangement of the third pair of contact points, therefore, can uniformly transfer load from the dump body 30 through the support rockers 274 and the space frame 20 to the front suspension system.

The front upper frame connection 270 can also include the forward support plates 2710 and the forward flat mounting surfaces 2714. The forward support plates 2710 may be fixedly attached to the front surface 278, for instance, via welding. Alternatively, the forward support plates 2710 can be formed in one-piece or integral with the front surface 278.

A cutout section 2700 can be provided at least between the forward flat mounting surfaces 2714 and, as shown in FIGS. 4-9, in one or more embodiments between the forward support plates 2710. The front surface 278 and/or the forward support plates 2710 may define the cutout section 2700. Thus, in one or more embodiments, the cutout section 2700 may be considered integral to the forward support plates 2710. The cutout section 2700 may provide a space for an aftertreatment component of the machine 10.

The forward support plates 2710, which may extend above the top surface 271, can run from ends at a transverse centerline of the top surface 271 between the two forward support plates 2710 outward and forward to respective opposite ends. As a non-limiting example, the opposite ends of the forward support plates 2710 can extend forward past the forward flat mounting surfaces 2714. The forward support plates 2710 can conform to the contour of the cutout section 2700. The forward support plates 2710 can be configured as a brace or a rib to accommodate for forces in a rollover event, for instance, and/or twisting and bending forces during driving and hauling of the machine 10.

The forward support plates 2710 and the forward flat mounting surfaces 2714 can contact or abut different portions of respective front upper suspension connections 280. For example, the forward support plates 2710, particularly outer lateral sides 2712 thereof, can contact inward facing portions of the front upper suspension connections 280. Optionally, the forward support plates 2710 may not be fixedly attached (e.g., welded) to the front upper suspension connections 280. The forward flat mounting surfaces 2714, on the other hand, can contact or abut rear mounting surfaces of the front upper suspension connections 280. The forward flat mounting surfaces 2714 can be fixedly attached (e.g., welded) to the rear mounting surfaces of the front upper suspension connections 280. According to one or more embodiments, the forward support plates 2710 can acts as a guide to guide placement of the front upper frame connection 270 relative to the front upper suspension connections 280.

The rear left-side mounting surface 2702 can be fixedly attached (e.g., weldably attached) to elongate support member 203. The rear right-side mounting surface 2704 can be fixedly attached (e.g., weldably attached) to horizontal frame support 2750, which may be a fabrication. The outer bottom mounting surfaces 2706 can have fixedly attached (e.g., weldably attached) thereto front upper frame connections 250. The inner bottom mounting surfaces 2708 can have fixedly attached (e.g., weldably attached) thereto elongate support members 207. The truck cab mounting point 2720, along with truck cab mounting point 2722, can be configured to receive a cab isolation mount for mounting the operator cabin 18.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A front upper body support and frame connection fabrication for a space frame of a rear haul truck, the front upper body support and frame connection fabrication comprising:
    a top surface;
    a bottom surface opposite the top surface;
    a right-side surface;
    a left-side surface opposite the right-side surface;
    a pair of forward support plates configured to support a pair of front upper suspension connection fabrications;
    a pair of forward flat mounting surfaces configured to respectively fixedly attach to the front upper suspension connection fabrications;
    a cutout section positioned between and integral to the pair of forward support plates;
    a rear left-side mounting surface located at a rear of the left-side surface and configured to weldably attach a cab support frame tube;
    a rear right-side mounting surface located at a rear of the right-side surface and configured to weldably attach a horizontal frame support fabrication;
    a pair of outer bottom mounting surfaces located at a rear of the bottom surface and orientated toward the left-side surface and right-side surface, respectively, and configured to weldably attach a pair of front upper frame connection castings;
    a pair of inner bottom mounting surfaces located at the rear of the bottom surface and orientated away from the left-side surface and right-side surface, respectively, and configured to weldably attach a pair of angled front frame tubes;
    a pair of rocker attachment interfaces located at a rear of the top surface and positioned toward the left-side surface and right-side surface, respectively, and configured to pivotably attach a pair of support rockers; and
    a truck cab mounting point located on the top surface and configured to receive a cab isolation mount.

2. The front upper body support and frame connection fabrication of claim 1, wherein the top surface has a length greater than at least twice a width thereof.

3. The front upper body support and frame connection fabrication of claim 1, wherein the rocker attachment interfaces are fabrications.

4. The front upper body support and frame connection fabrication of claim 1, wherein the truck cab mounting point is between the forward flat mounting surface and the rocker attachment interface on a left side of the top surface.

5. The front upper body support and frame connection fabrication of claim 1, wherein the forward support plates extend above the top surface.

6. The front upper body support and frame connection fabrication of claim 1, wherein the forward support plates extend forward past the forward flat mounting surfaces.

7. A space frame of a rear haul truck comprising:
    a front upper body support and frame connection fabrication having a top surface, a bottom surface opposite the top surface, a right-side surface, and a left-side surface opposite the right-side surface;
    a pair of support rockers attached to the top surface of the front upper body support and frame connection fabrication via respective rocker attachment interfaces on the top surface of the front upper body support and frame connection fabrication;
    a pair of front upper frame connections attached to the bottom surface of the front upper body support and frame connection fabrication via respective outer bottom mounting surfaces on the bottom surface of the front upper body support and frame connection fabrication; and
    a pair of angled front frame tubes attached to the bottom surface of the front upper body support and frame connection fabrication via respective inner bottom mounting surfaces on the bottom surface of the front upper body support and frame connection fabrication, wherein the front upper body support and frame connection fabrication further includes:
a pair of forward support plates,
a pair of forward flat mounting surfaces, and
a cutout section between the forward support plates.

8. The space frame of claim 7, wherein the forward support plates are forward of the forward flat mounting surfaces in a length direction of the space frame, the forward flat mounting surfaces are forward of the rocker attachment interfaces in the length direction of the space frame, and the rocker attachment interfaces are forward of a rear surface of the front upper body support and frame connection fabrication.

9. The space frame of claim 7, wherein the front upper body support and frame connection fabrication further includes:
   a rear left-side mounting surface located at a rear portion of the left-side surface; and
   a rear right-side mounting surface located at a rear portion of the right-side surface.

10. The space frame of claim 9, further comprising:
    a cab support frame tube weldably attached to the rear left-side mounting surface; and
    a horizontal frame support fabrication weldably attached to the rear right-side mounting surface.

11. The space frame of claim 7, wherein the forward support plates each have a first portion that is perpendicular to a rear surface of the front upper body support and frame connection fabrication and a second portion that is parallel to the right-side surface and left side surfaces.

12. The space frame of claim 7, wherein a length of the front upper body support and frame connection fabrication is greater than a width of the front upper body support and frame connection fabrication, the length running in a width direction of the space frame.

13. The space frame of claim 7, wherein the rocker attachment interfaces are positioned at respective opposite rear corners of the top surface of the front upper body support and frame connection fabrication.

14. A front upper frame connection for a space frame comprising:
    a top surface;
    a bottom surface opposite the top surface;
    a right-side surface;
    a left-side surface opposite the right-side surface and parallel to the right-side surface;
    a front surface;
    a rear surface opposite the front surface;
    a pair of forward support plates provided on the front surface;
    a pair of forward flat mounting surfaces; and
    a pair of rocker attachment interfaces located on the top surface adjacent to the rear surface and respectively the right-side surface and the left-side surface,
    wherein the front surface and the forward support plates define a cutout section, and
    wherein each of the forward support plates is curved such that a first portion is parallel to the rear surface and a second portion is perpendicular to the rear surface, the first portion being closer to a transverse centerline of the front upper frame connection than the second portion.

15. The front upper frame connection of claim 14, further comprising:
    a rear left-side mounting surface located at a rear of the left-side surface;
    a rear right-side mounting surface located at a rear of the right-side surface;
    a pair of outer bottom mounting surfaces located at a rear of the bottom surface and orientated toward the left-side surface and right-side surface, respectively; and
    a pair of inner bottom mounting surfaces located at the rear of the bottom surface and orientated away from the left-side surface and right-side surface, respectively.

16. The front upper frame connection of claim 15,
    wherein the rear left-side mounting surface is adapted to weldably attach a cab support frame tube,
    wherein the rear right-side mounting surface is adapted to weldably attach a horizontal frame support,
    wherein the outer bottom mounting surfaces are adapted to weldably attach a pair of front upper frame connections, and
    wherein the inner bottom mounting surfaces are adapted to weldably attach a pair of angled front frame tubes.

17. The front upper frame connection of claim 14, further comprising a truck cab mounting point located on the top surface.

18. The front upper frame connection of claim 14, wherein a length of the top surface is greater than a width of the top surface in an overhead plan view of the front upper frame connection.

19. The front upper frame connection of claim 14,
    wherein the forward support plates are adapted to abut respective front upper suspension connections,
    wherein the forward flat mounting surfaces are adapted to be respectively fixedly attached to the front upper suspension connections, and
    wherein the rocker attachment interfaces are adapted to be respectively pivotally coupled to support rockers.

20. The front upper frame connection of claim 14, wherein the forward support plates are closer to a transverse centerline of the top surface than the forward flat mounting surfaces.

* * * * *